United States Patent [19]

Ziniades

[11] 4,290,403
[45] Sep. 22, 1981

[54] METHOD AND APPARATUS FOR PROVIDING OPTIMUM FUEL-TO-AIR RATIO FOR INTERNAL COMBUSTION ENGINE

[76] Inventor: Emmanuel J. Ziniades, 314 Kirstenbosch Flats, 60 Dundalk Ave, Parkview, Johannesburg, Transvaal Province, South Africa

[21] Appl. No.: 96,670

[22] Filed: Nov. 23, 1979

[30] Foreign Application Priority Data

Nov. 28, 1978 [ZA] South Africa ............... 78/6677

[51] Int. Cl.³ ............... F02M 25/06; F02M 23/00
[52] U.S. Cl. ............... 123/568; 123/587
[58] Field of Search ............... 123/568, 569, 571, 587

[56] References Cited

U.S. PATENT DOCUMENTS

| | | | |
|---|---|---|---|
| 2,211,336 | 8/1940 | Linder | 123/587 |
| 2,633,868 | 4/1953 | Berhoudar | 137/480 |
| 3,866,586 | 2/1975 | Scott, Jr. | 123/568 |
| 3,931,813 | 1/1976 | Horie et al. | 123/568 |
| 4,024,847 | 5/1977 | Koganemaru | 123/571 |
| 4,106,464 | 8/1978 | Yamashita | 123/571 X |
| 4,117,814 | 10/1978 | Takahashi | 123/568 |

FOREIGN PATENT DOCUMENTS

| | | |
|---|---|---|
| 674784 | 4/1939 | Fed. Rep. of Germany . |
| 820991 | 11/1951 | Fed. Rep. of Germany . |
| 810555 | 1/1952 | Fed. Rep. of Germany . |
| 2719775 | 7/1978 | Fed. Rep. of Germany . |
| 635327 | 4/1950 | United Kingdom . |
| 1290947 | 9/1972 | United Kingdom . |
| 2012000 | 7/1979 | United Kingdom ......... 123/571 |

*Primary Examiner*—Wendell E. Burns
*Attorney, Agent, or Firm*—Cushman, Darby & Cushman

[57] ABSTRACT

The invention provides a method of, and apparatus for, controlling the fuel to air ratio of the fuel mixture to an internal combustion engine which includes a fuel mixture feed system having a known type of carburettor. In the method the fuel mixture is supplemented with air and exhaust gas by utilizing pressure controlled air and exhaust gas valves operated by pressure changes in the fuel feed system and/or intake manifold of the engine so that the valves open when the fuel to air ratio of the fuel mixture supplied by the carburettor is in excess of a predetermined value.

6 Claims, 3 Drawing Figures

METHOD AND APPARATUS FOR PROVIDING OPTIMUM FUEL-TO-AIR RATIO FOR INTERNAL COMBUSTION ENGINE

This invention relates to a method of saving fuel in internal combustion engines and of reducing wasteful and/or harmful exhaust emission, and to apparatus therefor.

In internal combustion engines using the normal type of carburettor it is well known that the optimum, or near optimum, fuel to air ratio for the fuel/air mixture can only be achieved over a relatively small range of engine speeds and loads. Because the ratio increases with increasing engine speed an increasing amount of fuel remains unburned and is wasted in the exhaust gases.

The deviation from the optimum fuel to air ratio is the result of several factors which include the following:

Firstly, it will be appreciated that the mixture flow through the carburettor is not steady but pulsates because of pressure fluctuations in the induction pipe. Furthermore, while light hydrocarbon fuel such as petrol may be considered to be viscous but incompressible for present considerations this is not true for air. Air is both compressible and viscous, this latter characteristic giving rise to turbulent instead of stream-lined flow in the carburettor. It will be appreciated however that in air and fuel both the viscosity and density are dependant on prevailing temperatures.

It is thus an object of this invention to provide a method and apparatus whereby the range of engine speeds and operating conditions in which the fuel to air ratio approaches the optimum value may be increased in comparison with the ranges achieved by carburettors of the type normally used.

According to the invention a method of controlling the fuel to air ratio of the fuel mixture to an internal combustion engine which includes a fuel mixture feed system having a known type of carburettor comprises supplementing the fuel mixture with air and exhaust gas by utilizing pressure controlled air and exhaust gas valves operated by pressure changes in the fuel feed system and/or intake manifold of the engine so that the valves open when the fuel to air ratio of the fuel mixture supplied by the carburettor is in excess of a predetermined optimum value.

Further according to the invention the fuel mixture is supplemented by different air and exhaust gas valves in different pressure ranges and the extent to which the fuel mixture is supplemented is proportional to the pressure in any predetermined range.

According to another aspect of the invention apparatus for controlling the fuel to air ratio of the fuel mixture to an internal combustion engine which includes a fuel mixture feed system having an inlet manifold and known type of carburettor comprises at least one pressure controlled air flow valve having an inlet for connection to a source of air and an outlet for connection to the inlet manifold; at least one pressure controlled exhaust gas flow valve having an inlet for connection to a source of exhaust gas and an outlet for connection to the inlet manifold; and means associated with each valve for regulating flow through the valve proportional to a variable pressure in the fuel mixture feed system, the means being adapted for connection to the feed system at a suitable point which is subject to a variable pressure during operation of the engine.

Further according to the invention each valve includes a tapered portion of predetermined taper projecting from a closure for the valve through an orifice formed by a seat for the valve; and flow regulating means includes a diaphragm for operating the valve and means for biasing the valve towards a position; and the biasing means is adjustable.

Still further according to the invention the air flow valve and the exhaust gas flow valve are arranged in a set with common means for regulating the flow therethrough and a common outlet for connection to the fuel mixture feed system; and the valves of the set are normally closed at atmospheric pressure and open over a range of decreasing pressure.

Still further according to the invention there is a plurality of air flow valves and a plurality of exhaust gas flow valves arranged in sets with each set including means for regulating flow through the valve according to a variable pressure and with each set being operable in a different pressure range.

Still further according to the invention there are three sets of air flow and exhaust gas flow valves and the valves of one set are normally open at atmospheric pressure and close over a range of decreasing pressure and the valves of the remaining two sets are normally closed at atmospheric pressure and open over ranges of decreasing pressure.

A preferred embodiment of the invention described by way of example only, flows with reference to the accompanying drawings in which.

In the discussion below a method of and apparatus for controlling the fuel to air ratio of the fuel feed mixture for an internal combustion engine are described. This engine has a fuel mixture feed system which includes an inlet manifold and a carburettor with at least one venturi and butterfly valve.

The apparatus comprises three sets of valves with each set including an air flow valve and an exhaust gas flow valve. As all three sets have essentially the same basic features only one set will be fully described, the other two sets differing therefrom in configuration only so that the particular operation of the sets of valves may be catered for.

Figure 1:
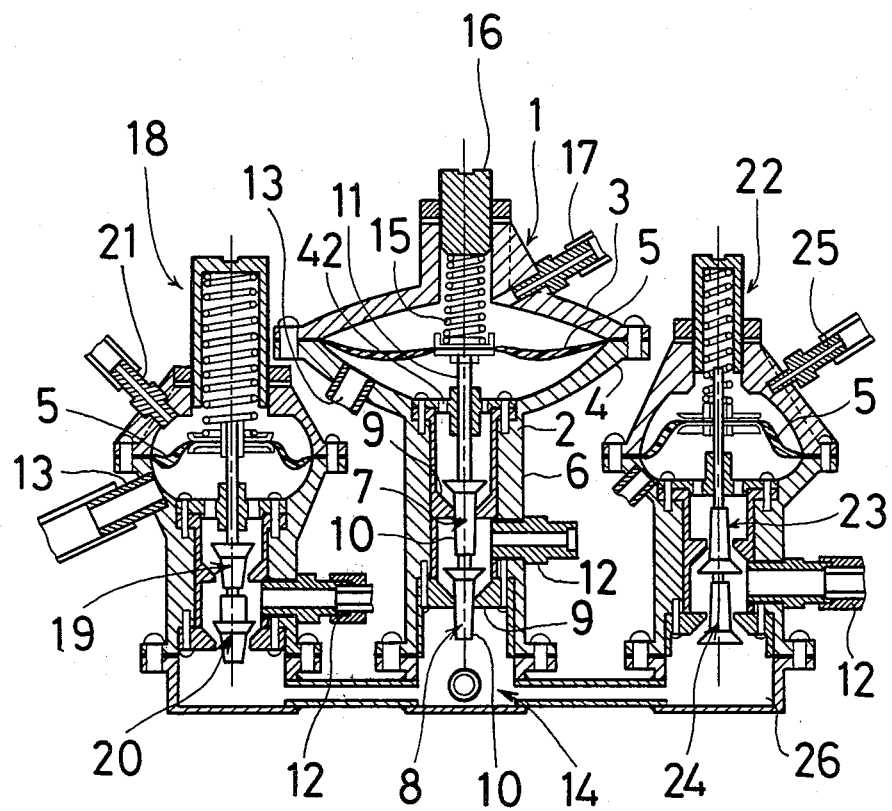
FIG. 1 is a cross-section through the valves of a fuel saving apparatus.

Considering the central or first set of valves (indicated by numeral 1) of FIG. 1 it may be seen that the set comprises a housing 2 which is transversely split into upper and lower dished portions which are numbered 3 and 4 respectively. A diaphragm 5 of neoprene and fabric construction, for example, is located within the housing between the two portions thus separating them.

Co-axial and integral with the lower dished portion 4 of the housing is a hollow cylindrical extension 6 in which are located two axially spaced valves 7 and 8. The one valve 7 closer to the diaphragm is an air flow valve whereas the other valve 8 is an exhaust gas flow valve.

Each of the valves includes an annular valve seat 9 and a tapered valve closure 10 which projects into and through the relevant valve seat from the diaphragm side thereof. Both closures 10 are mounted on a single pintle 11 which is centrally attached to the diaphragm 5, and slides through a spider guide 42 conveniently placed away from the influence of exhaust gases, and allowing air to pass through the openings between the ribs of the spider.

Centrally located between the two valve seats 9 is a common air and exhaust gas outlet 12 while an air inlet 13 for the air flow valve 7 is located in the wall of the lower dished portion and an exhaust gas inlet 14 for the exhaust gas flow valve 8 is at the end of the cylindrical extension 6.

In the upper dished portion 3 of the housing is a compression type coil spring 15 which extends co-axially between the housing and the centre of the diaphragm. This spring 15 thus biases the diaphragm towards the lower portion 4 of the housing and hence the two valves towards their closed positions. The biasing force is adjustable using a screw-type adjuster 16 at the end of the spring remote from the housing, the adjuster being accessible from the outside of the housing.

The area inside the upper dished portion 3 of the housing 2 is gas-tight except for a nipple 17 communicating therewith for connection in the manner described below. If a reduced pressure is applied to this nipple 17 the diaphragm will lift the pintle 11 thus progressively opening both valves 7 and 8. The progressive opening of the valves corresponds to the range of pressure drop occuring at the throat of the venturi and at a point immediately above the throttle valve on the carburettor side of the throttle valve for the engine. This pressure drop is proportional to the speed of the air flowing through the throat of the venturi and closely follows variation in throttle and load conditions for the engine during acceleration and cruising.

The second set of valves indicated by numeral 18 is essentially the same as the set 1 described above, but is operable in a range of pressure lower than the first set and corresponding to pressures in the inlet manifold of the engine where the associated vehicle is running against compression or decelerating rapidly. Thus the air flow valve 19 and the exhaust gas flow valve 20 of this set are biased towards their closed position and the nipple 21 in the upper dished portion of the housing is for connection to the inlet manifold of the engine.

Numeral 22 indicates generally the third set of valves. In this set the air flow valve 23 and exhaust gas flow valve 24 are operable in the opposite manner to those of the two sets described above. Thus they are biased by the coil spring 15 towards their open position and are fully open when the engine is not running. The nipple 25 of this set of valves is connectable in parallel with the nipple 21 of the second set 18 to the inlet manifold. A relatively small decrease in pressure on the diaphragm is sufficient for the spring to cause the valve to open progressively and in accordance with intake manifold pressures existing above idling speeds of the engine.

All three of the sets of valves are mounted at their exhaust gas inlets 14 to a common exhaust gas supply manifold 26. This manifold is in turn connected to the exhaust of the engine and includes a suitable collector device to divert a portion of the exhaust gases into the manifold 26. The pipe is suitably coiled and this portion placed, for example, at the rear of the engine fan to provide for cooling of the exhaust gases prior to their admission into the common exhaust gas supply manifold 26.

Figure 2:
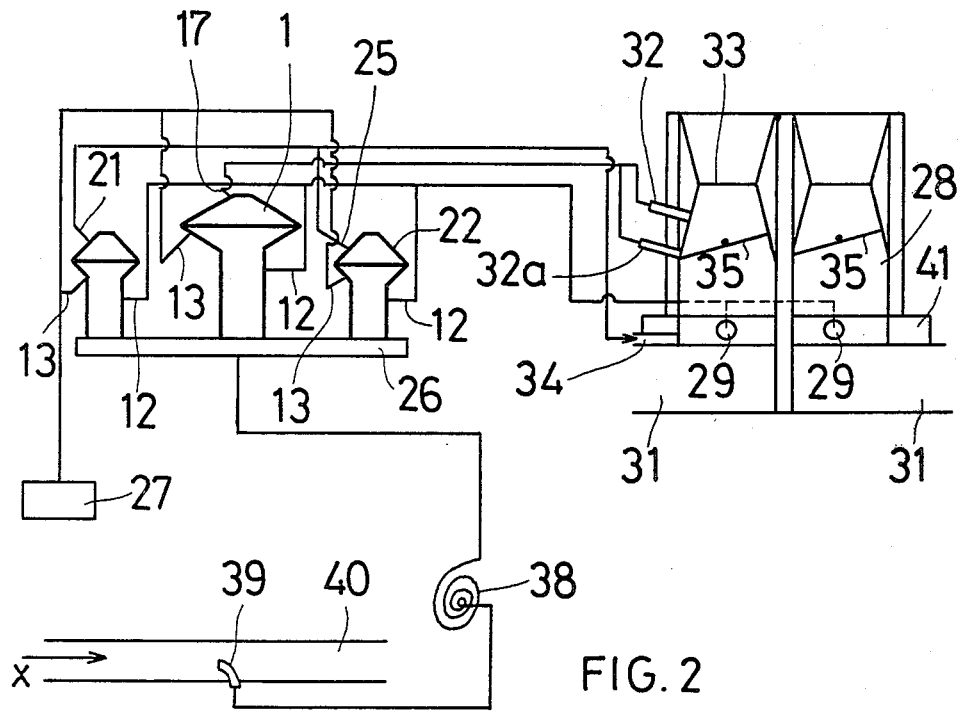
FIG. 2 is a schematic diagram of fuel saving apparatus.
Figure 3:
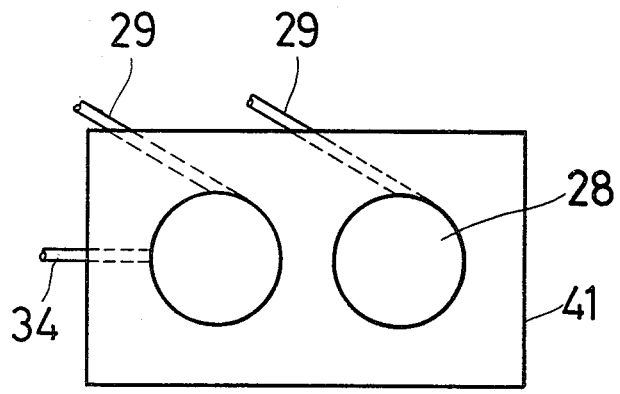
FIG. 3 is a plan of a spacer for insertion between a carburettor and inlet manifold of an engine.

In FIG. 2 the various connections of the apparatus are shown diagrammatically and are as follows:

The air inlets 13 of all three sets of valves are connected in parallel to a suitable air filter 27 and the common air and exhaust gas outlets 12 are connected to a suitable spacer 41 inserted between the carburettor and intake manifold. The air and exhaust gases are admitted into the manifold through apertures provided in the inlet flange in a tangentially swirling manner and perpendicular to the direction of normal flow of air/fuel mixture through the carburettor. This assists in obtaining an even distribution of air/fuel mixture to the various cylinders through the manifold passages, thus obviating misfiring or burning of the engine valves.

The pressure connection nipple 17 of the first set of valves 1 is connected through a tee piece to a nipple 32 of a barrel of the carburettor at the throat of venturi 33 thereof and to a nipple 32A at a point immediately above the throttle valve on the carburettor side. The pressure connection nipples 21 and 25 of the remaining two sets of valves are connected in parallel to a nipple 34 of the intake mainifold flange.

Lastly the exhaust gas manifold 26 is connected to a collector 39 which projects suitably into the exhaust pipe 40 for the engine, just immediately after the exhaust manifold outlet of the engine, and the direction of gas flow is indicated by arrrow x. Furthermore the collector pipe is suitably coiled as shown at 38 and placed at the rear of the fan for cooling the exhaust gases prior to their admission into the common exhaust gas supply manifold 26.

When the engine is not running and atmospheric pressure prevails as the controlling pressure for the apparatus the set of valves 1 and 18 are both fully closed whereas the set of valves 22 is fully open. After the engine has been started and is running at idling speeds, valves 23 and 24 are closed by the pressure in the intake manifold.

As the speed of the engine is increased there is a drop in pressure at the throat of the carburettor venturi and at the point immediately above the throttle valve on the carburettor side which is transmitted to the diaphragm of valves 7 and 8. The magnitude of the drop is proportional to the speed of the air flowing through the throat of the venturi and dependant on the extent to which the butterfly 35 of the carburettor is opened and the engine speed. The decreased pressure on the engine side of the throttle valve causes the valves 23 and 24 to open under the pressure of the spring, the extent of opening being dependant on the magnitude of the pressure drop. On the other hand, the decrease in pressure on the engine side of the throttle valve causes valves 19 and 20 to open against the spring.

If the engine is made to run against compression (as, for example, in the case of a vehicle moving downhill under its own momentum or when changing gears) the decrease in pressure in the inlet manifold 26 is sufficient to open the valves 19 and 20 thus further diluting the fuel and air mixture to the engine. The increase in pressure in the venturi will cause the valves 7 and 8 to close off to a great extent.

The air flow through all three sets of valves may be controlled as mentioned above by the degree of taper of their closures and by the amount of bias on the springs. Further, by making adjustments to the apparatus using these two factors the correct correlation between the valves may be obtained.

The invention thus provides a method and apparatus for improved control of the fuel to air ratio of the feed mixture of an internal combustion engine. Furthermore, ...el is also saved by recirculating a small amount of the exhaust gases from the engine, which dilute the mixture, lower combustion temperature, inhibit the formation of nitrogen oxides and enhance the octane rating of the engine, thus enabling the use of lower octane fuel without early detonation occuring, (on a weight basis the calorific value does not vary by more than 1% and on a volume basis the variation is little more).

The admission of warm exhaust gases minimizes losses of fuel through condensation during the periods of cold starting and warm-up, and permits the use of leaner mixtures without surging and to some extent alleviates the carburettor 'icing' phenomena.

During deceleration the intake manifold vacuum increases to higher than 23 inches of mercury and about one quarter of the mixture in the cylinder is residual gas, which does not burn properly, thus the admission of air and exhaust gases assists in reducing the large quantities of unburned hydrocarbon normally passing through the engine under these conditions.

Other embodiments are envisaged within the scope of the invention and these include the use of a single set of valves or any suitable number of sets. Furthermore, the valves may be of other configurations and types as may be the means for regulating the flow through the valves.

What I claim as new and desire to secure by Letters Patent is:

1. A method of controlling and providing an optimum fuel-to-air ratio for the fuel mixture for an internal combustion engine which includes a fuel mixture feed system having a known type of carburetor and an inlet manifold, comprising:

supplementing the fuel mixture with air and exhaust gas by utilizing a plurality of pressure-operable dual air and exhaust gas flow-controlling valves each responsive to and controlled by pressure changes in the fuel feed system so that the valves open when the fuel-to-air ratio of the fuel mixture supplied by the carburetor is in excess of a predetermined value, with each valve being operable by a different range of pressures from the others and supplementing the mixture proportionately to the pressure operating the valve.

2. Apparatus for controlling and providing an optimum fuel-to-air ratio for the fuel mixture for an internal combustion engine having an exhaust conduit and a fuel mixture feed system which includes an inlet manifold and a known type of carburetor comprising:

at least two dual valves each having two inlets, one connectable to the atmosphere and the other to the exhaust conduit, two valve seats, two valve members cooperating with said seats for variably controlling flow respectively of air and exhaust gas through the valve, and outlet means connectable to the inlet manifold for supplying air and exhaust gas thereto;

pressure responsive means for each of said valves for simultaneously operating said two valve members thereof; and means for connecting each of said pressure-responsive means to the fuel mixture feed system at a position of variable pressure therein for operating the corresponding valve to variably control the flow of air and exhaust gas therethrough proportionately to the pressure at said position.

3. Apparatus as claimed in claim 2 in which each valve member is tapered to regulate the rate of flow through the corresponding valve seat; the two valve members of each valve are mounted on a common pintle; and each pressure responsive means includes a diaphragm connected to the corresponding pintle and adjustable means for biasing the pintle to move the valve members to one of open and closed positions.

4. Apparatus as claimed in claim 3 in which the biasing means is arranged to close the corresponding valve at system atmospheric pressure and to open it over a range of decreasing system pressures.

5. Apparatus as claimed in claim 3 in which there are three dual valves and in which the biasing means for two of the valves is arranged to close them at system atmospheric pressure and to open them over a range of decreasing system pressures, and the biasing means for the third valve is arranged to open it at system atmospheric pressure and to close it over a range of decreasing system pressures.

6. The apparatus defined in claim 2 in which each pressure-responsive means is responsive to a different range of pressures.

* * * * *